United States Patent [19]

Mase et al.

[11] E Patent Number: Re. 33,129

[45] Reissued Date of Patent: Dec. 12, 1989

[54] VACUUM PUMP

[75] Inventors: Mashiro Mase, Nogi; Takashi Nagaoka, Chiyoda; Yoshitsugu Tsutsumi, Nogi; Minoru Taniyama, Nogi; Makoto Terajima, Nogi, all of Japan

[73] Assignee: Hitachi, Ltd., Tokyo, Japan

[21] Appl. No.: 90,044

[22] Filed: Aug. 26, 1987

Related U.S. Patent Documents

Reissue of:

[64] Patent No.: 4,668,160
Issued: May 26, 1987
Appl. No.: 855,432
Filed: Apr. 24, 1986

[51] Int. Cl.[4] ..... F01D 1/36

[52] U.S. Cl. ..... 415/90; 415/143

[58] Field of Search ..... 415/90, 143

[56] References Cited

U.S. PATENT DOCUMENTS

| | | | |
|---|---|---|---|
| 3,045,428 | 7/1962 | McLean | 415/90 |
| 3,969,039 | 7/1976 | Shoulders | 415/90 |
| 4,579,508 | 4/1986 | Tsumaki et al. | 415/90 |
| 4,668,160 | 5/1987 | Mase et al. | 415/90 |
| 4,732,529 | 3/1988 | Narita et al. | 415/90 |

FOREIGN PATENT DOCUMENTS

| | | |
|---|---|---|
| 879452 | 6/1953 | Fed. Rep. of Germany . |
| 41801 | 9/1981 | Japan . |

OTHER PUBLICATIONS

"Fans" by Bruno Eck, Oct. 1949, p. 463.

*Primary Examiner*—Robert E. Garrett
*Assistant Examiner*—John T. Kwon
*Attorney, Agent, or Firm*—Antonelli, Terry & Wands

[57] ABSTRACT

A vacuum pump including a centrifugal compressor stage on the side of a suction opening and a circumferential flow compressor on the side of an exhaust opening. The centrifugal compressor pump works as a Siegbahn pump at a steady state, and works as a centrifugal compressor under a transient condition at the initial stage of the pump operation, thus obtaining a high pumping speed under the transient condition.

10 Claims, 3 Drawing Sheets

VACUUM PUMP

Matter enclosed in heavy brackets [ ] appears in the original patent but forms no part of this reissue specification; matter printed in italics indicates the additions made by reissue.

BACKGROUND OF THE INVENTION

The present invention relates to a vacuum pump capable of evacuating gaseous body from the atmospheric pressure to a high-vacuum and relates more particularly to a vacuum pump suitable for making a clean vacuum in semiconductor manufacturing apparatus.

Sputter ion pumps, turbomolecular pumps, cryo pumps, etc. have been known as conventional types of vacuum pumps. Any type of these pumps requires a roughing pump or a backing pump in order to evacuate air from the atmospheric pressure to a high-vacuum and they necessitate complicated controllers and the like for controlling the operation of both pumps, thus enlarging the size of the system using vacuum and the installation space for accommodating the system.

One known type of pump for enabling evacuation to be carried out from the atmospheric pressure to a high-vacuum has been proposed in U.S. Pat. No. 3,969,039 wherein pump is bilaterally symmetrical and is provided, in the housing, with a turbomolecular pump stage, a spiral molecular drag pump stage, a centrifugal compressor stage and a vortex diode pump stage located one after another from the side of a suction opening to the side of exhaust opening.

The turbomolecular pump stage is composed of alternate combinations of fixed plates attached to an inner wall of the housing and rotating disc plates attached to the rotating shaft. The spiral molecular drag pump stage is composed of alternate combinations of fixed plates attached to an inner wall of the housing and impellers in the form of disc plates attached to the rotating shaft. The centrifugal compressor stage is composed of alternate combinations of fixed plates with a diffuser attached to an inner wall of the housing and impellers attached to the rotating shaft. The vortex diode pump stage is composed of alternate combinations of fixed disc plates attached to an inner wall of the housing and rotating disc plates attached to the rotating shaft.

The rotating shaft is driven through the medium of a turbine which is connected to air inlet and air outlet ports formed in a side wall of the housing.

A vacuum pump arranged as described above can effect satisfactory compressing work when it reaches a steady state, the pressure at the suction opening, that is, the ultimate pressure thereby being sufficiently lowered. However, at the initial stage of the operation of the pump, that is a transient condition, the ppmp does not work at a sufficient pumping speed. In such a transient condition, the turbomolecular pump stage and the spiral molecular drag pump stage which are effective for the molecular flow air or the transition flow air do not substantially effect the compressing work because of the high pressure in the pump. The flow passage of the spiral molecular pump stage has an especially small sectional area so as to have higher pressure ratio, thereby causing high pressure loss while at a high flow rate.

The object of the present invention is to provide a vacuum pump which is capable of evacuating air from the atmospheric pressure to a high vacuum so as to obtain a clean vacuum and which can work at a high pumping speed under a transient condition at the initial stage of the pump operation.

To this end, the present invention provides a pump comprising a housing having suction and exhaust openings, a rotating shaft rotatably supported in this housing, a plurality of fixed members attached to an inner wall of the housing, and a plurality of rotating members attached to the rotating shaft, the fixed members and the rotating members being alternately disposed so as to constitute pump stages in which a centrifugal compressor stage is constituted on the side of the suction opening and a circumferential flow pump stage is constituted on the side of the exhaust opening, with the rotating member of the centrifugal compressor stage being composed of an open-form impeller having a plurality of backward vanes. This pump is designed to work as a Siegbahn molecular pump in a steady state, and to work as a centrifugal compressor under a transient condition of the initial pump operation, thus obtaining a high pumping speed under the transient condition.

DETAILED DESCRIPTION

Figure 1:
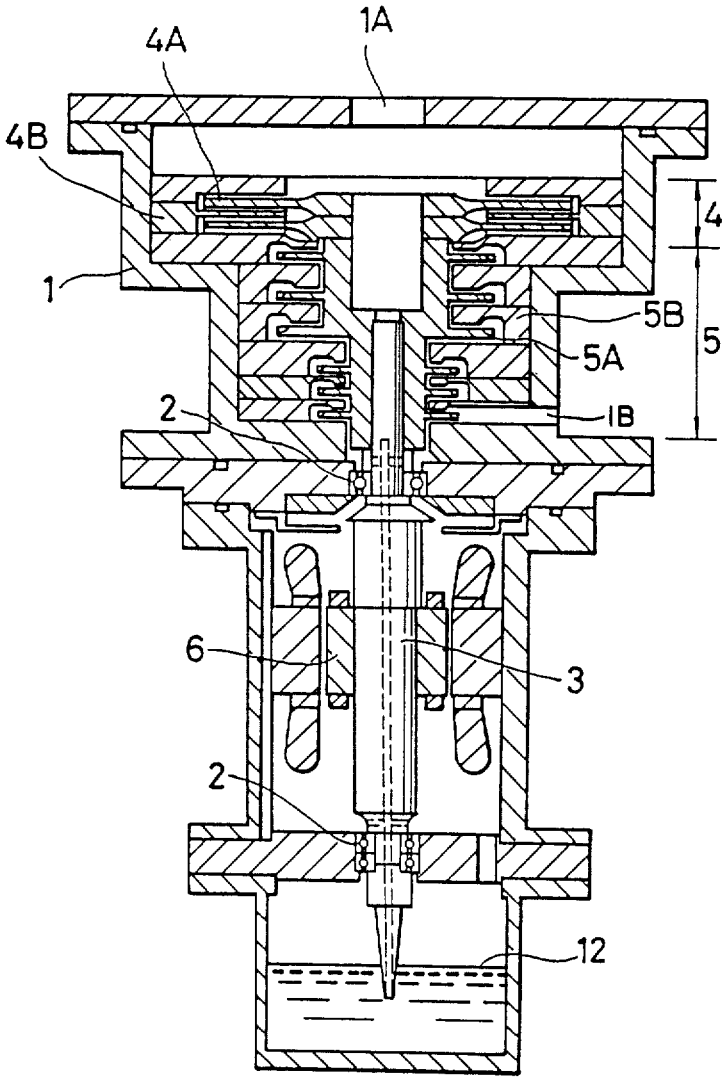
FIG. 1 is a longitudinal sectional drawing showing the general construction of a vacuum pump.

Referring now to the drawings wherein like reference numerals are used throughout the various views to designate like parts and, more particularly, to FIG. 1, according to this figure, a vacuum pump includes a housing 1 having a suction opening 1A and an exhaust opening 1B, a rotating shaft 3 rotatably supported by bearings 2 in the housing 1, a centrifugal compressor stage 4 and a circumferential flow compressor stage 5 placed one by one in the housing 1 from the suction opening 1A to the exhaust opening 1B. The rotating shaft 3 is driven by a motor 6 connected thereto.

Figure 2:
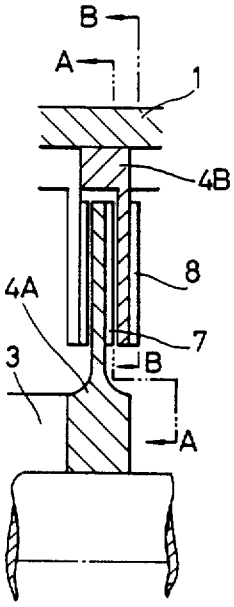
FIG. 2 is a cross-sectional view of a detail of a centrifugal compressor stage of FIG. 1.
Figure 3:
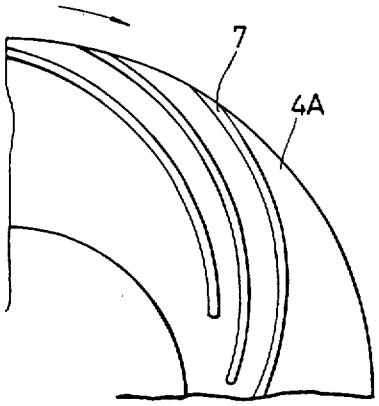
FIG. 3 is a detail view taken along a line A—A in FIG. 2.
Figure 4:
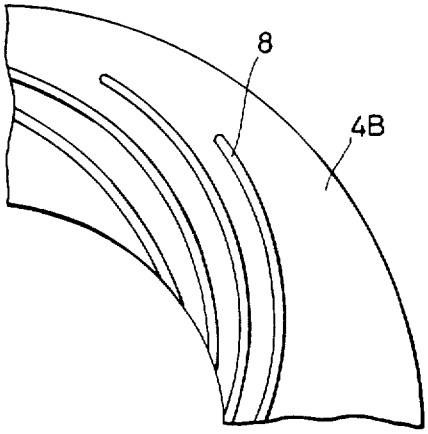
FIG. 4 is a detail view taken along a line B—B in FIG. 2

As shown in FIGS. 2 and 3, the centrifugal compressor stage 4 is provided with open-form impellers each of which has a plurality of backward vanes 7 inwardly directed relative to the direction of rotation and is attached to the rotating shaft 3. The centrifugal compressor stage 4 is also provided with, as shown in FIGS. 2 and 4, a fixed disc plate 4B attached to an inner wall of the housing 1 and has a plurality of vanes 8 which are inwardly directed relative to the direction of the rotation and which are located on a side facing the reverse side of the impeller 4A, namely, the side on which the vanes 7 are not placed. The open-form impellers 4A and the fixed disc plate 4B are alternately disposed.

Figure 5:
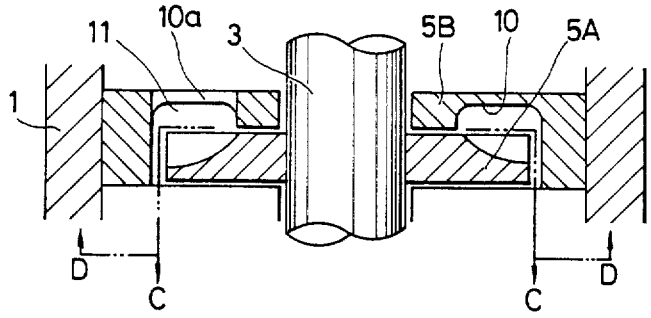
FIG. 5 is a cross-sectional view showing a detail of a circumferential flow compressor stage.
Figure 6:
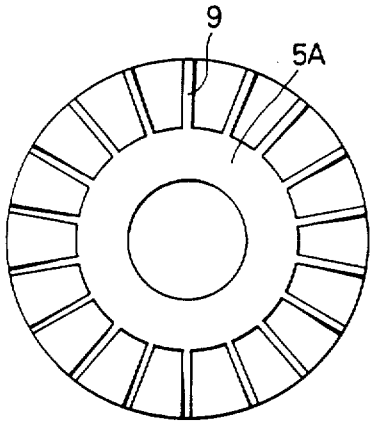
FIG. 6 is a detailed view taken along a line C—C in FIG. 5.
Figure 7:
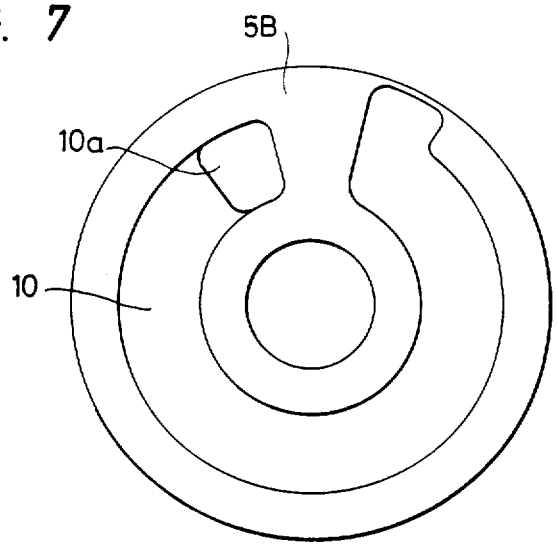
FIG. 7 is a detail view taken along a line D—D in FIG. 5.

As shown in FIGS. 5 and 6, the circumferential compressor stage 5 is provided with impellers 5A respectively attached to the rotating shaft 3 and has a plurality of vanes 9 at the outer circumference thereof and is provided with, as shown in FIGS. 5 and 7, fixed disc plates 5B respectively attached to an inner wall of the housing 1 and having U-shaped grooves 10 formed on one side thereof facing the surface of the impellers 5A, namely, the side on which the vanes 9 are located, the impellers 5A and the fixed disc plates 5B being alternately disposed. An air passage 11 is formed at the end portion of the groove 10 by boring a hole 10a therein, as shown in FIGS. 5 and 7. A lublicating oil tank 12 supplies lublicating oil to the bearings 2 through an oil passage formed in the rotating shaft 3.

Under a transient condition at the initial stage of the pump operation, the total inside pressure of the pump is substantially equal to the atmospheric pressure, and the condition of that gas flow is a viscous flow, so that the centrifugal compressor stage 4 works as a centrifugal compressor. That is, the centrifugal compressor stage impeller 4A functions as a compressor impeller, and the flow passage formed between impellers 4A and the vanes 8 of the fixed disc plate 4B functions as a return channel for leading the flow from the outside diameter side to the inside diameter side. As the impellers 4A effects the compressing work, the centrifugal compressor stage 4 works as a compressor rather than a portion at which pressure loss occurs, thus discharging air at a high rate.

In a steady state where the compression ratio of the circumferential flow compressor stage 5 becomes large and the pressure at the suction opening of the circumferential flow stage becomes sufficiently lower, that is, in a steady state where this pressure is not more than about 6 Torr, the condition of that gas flow is a transient flow or a molecular flow at the suction opening 1A of the pump, so that the centrifugal compressor works as a Siegbahn molecular pump. That is, the impeller 4A, having the vanes 7, functions as a rotating disc plate with helical grooves and works as a Siegbahn molecular pump which effects compressing work in combination with the reverse side of the impeller 4A, namely, the side on which the vanes 7 are not located.

In the steady state, the bulk flow rate is substantially zero, since a quantity of gas which flows into the circumferential flow compressor stage 5 has been sufficiently compressed by the centrifugal compressor stage 4. Then, the circumferential flow compressor stage 5 is operated substantially at zero capacity, and reaches the ultimate low pressure through a small number of members thereof because of the characteristic of circumferential flow compressors enabling a high compression ratio to be obtained at zero capacity.

The number of members and the rotational speed of the centrifugal compressor stage 4 and the circumferential flow compressor stage 5 are set such that, in a steady state of operation, the pressure at the boundary between both stages corresponds to the point of change between the viscous flow and the transient flow. Generally, a combination of the centrifugal compressor stage of one to three members and the circumferential flow compressor stage of six to ten members assures the pressure of $10^{-3}$ to $10^{-4}$ Torr.

According to the present invention, as described above, the centrifugal compressor stage works as a centrifugal compressor under a transient condition and works as a Siegbahn molecular pump in a steady state, thereby providing a double effect, so that, under condition that the pressure at the exhaust opening is maintained at atmospheric pressure, a clean vacuum can be obtained at the suction opening. Moreover, under a transient condition at the initial stage of the pump operation, the pump can work at a high pumping speed.

What is claimed is:

1. A vacuum pump comprising: a housing including suction and exhaust openings, a rotating shaft rotatably supported in said housing, a plurality of fixed members attached to an inner wall of said housing, and a plurality of rotating members attached to said rotating shaft, said fixed members and said rotating members being disposed alternately so as to form pump stages in which a centrifugal compressor stage is formed on a side of said suction opening and a circumferential flow pump stage is formed on a side of said exhaust opening, said rotating member of said centrifugal compressor stage including open-form impellers having a plurality of backward vanes, and wherein said fixed member of said centrifugal compressor stage includes a fixed disc plate with a plurality of vanes disposed so as to face a reverse side of said impeller and inwardly directed relative to the direction of rotation at an outside diametral portion of said fixed member.

2. A vacuum pump comprising: a housing including suction and exhaust openings, a rotating shaft rotatably supported in said housing, a plurality of fixed member attached to an inner wall of said housing, and a plurality of rotating members attached to said rotating shaft, said fixed members and said rotating members being disposed alternately so as to form pump stages in which a centrifugal compressor stage is formed on a side of said suction opening and a circumferential flow pump stage is formed on a side of said exhaust opening, said rotating member of said centrifugal compressor stage including open-form impellers having a plurality of backward vanes, and wherein a diameter of said circumferential flow compressor stage on a side of said exhaust opening is smaller than a diameter thereof on a side of said suction opening.

3. A vacuum pump according to claim 2, comprising: a housing including suction and exhaust openings, a rotating shaft rotatably supported in said housing, a plurality of fixed member attached to an inner wall of said housing, and a plurality of rotating members attached to said rotating /shaft, said fixed members and said rotating members being disposed alternately so as to form pump stages in which a centrifugal compressor stage is formed on a side of said suction opening and a circumferential flow pump stage is formed on a side of said exhaust opening, said rotating member of said centrifugal compressor stage including open-form impellers having a plurality of backward vanes, and wherein a diameter of said circumferential flow compressor stage on a side of said exhaust opening is smaller than a diameter thereof on a side of said suction opening.

*4. A vacuum pump comprising: a housing including a suction and exhaust openings, a rotating shaft rotatably supported in said housing, a plurality of fixed members attached to an inner wall of said housing, and a plurality of rotating members attached to said rotating shaft, said fixed members and said rotating members being disposed alternately so as to form pump stages in which a centrifugal compressor stage is formed on a side of said suction opening and a circumferential pump stage is formed in a side of said exhaust opening, said rotating member of said centrifugal compressor stage including impellers having a plurality of backward vanes, and wherein said fixed member of said centrifugal compressor stage includes the fixed disc plate with a plurality of vanes disposed so as to face the*

*reverse side of said impeller and inwardly directed relative to the direction of rotation of an outside diametral portion of said fixed member.*

*5. A vacuum pump comprising: a housing including a suction and exhaust openings, a rotating shaft rotatably supported in said housing, a plurality of fixed members attached to an inner wall of said housing, and a plurality of rotating members attached to said rotating shaft, said fixed members and said rotating members being disposed alternately so as to form pump stages in which a centrifugal compressor stage is formed on a side of said suction opening and a circumferential flow pump stage is formed in a side of said exhaust opening, said rotating member of said centrifugal compressor stage including impellers having a plurality of backward vanes, and wherein a diameter of said circumferential flow compressor stage on a side of said exhaust opening is smaller than a diameter thereof on a side of said suction opening.*

*6. A vacuum pump according to claim 5, comprising a housing including suction and exhaust openings, a rotating shaft rotatably supported in said housing, a plurality of fixed members attached to an inner wall of said housing, and a plurality of rotating members attached to said rotating shaft, said fixed members and said rotating members being disposed alternately so as to form pump stages in which a centrifugal compressor stage is formed on a side of said suction opening and a circumferential flow pump stage is formed on a side of said exhaust opening, said rotating member of said centrifugal compressor stage including impellers having a plurality of backward vanes, and wherein a diameter of said circumferential flow compressor stage on a side of said exhaust opening is smaller than a diameter thereof on a side of said suction opening.*

*7. A vacuum pump having a housing including a suction opening and an exhaust opening and a pump stage disposed in said housing, said pump stage comprising:*

*a centrifugal compressor stage means disposed on a side of the suction opening in said housing for obtaining a high compression ratio in a molecular flow and an intermediate flow region and then generating a compressive operation in a viscous flow region, a circumferential flow pump stage means disposed on a side of said exhaust opening in said housing for obtaining a high compression ratio in the viscous flow region, and a rotating shaft means disposed between said centrifugal compressor stage means and circumferential flow pump stage means.*

*8. A vacuum pump according to claim 7, wherein the centrifugal compressor stage means includes impeller means attached to the rotating shaft means, a fixed disc plate means attached to an inner wall of the housing and including a plurality of vanes inwardly directed relative to said direction of rotation and disposed on a reverse side of said impeller means.*

*9. A vacuum pump according to claim 8, wherein said impeller means and said fixed disc plate means are alternately arranged.*

*10. A vacuum pump according to claim 9 wherein said impeller means includes a plurality of backward vanes.*

* * * * *